Patented Oct. 10, 1950

2,525,279

UNITED STATES PATENT OFFICE 2,525,279

ALUMINUM PASTE PIGMENT

Everett R. Allen, Jersey City, N. J., assignor to Metals Disintegrating Company, Inc., Elizabeth, N. J., a corporation of New Jersey No Drawing. Application September 27, 1946, Serial No. 699,628

3 Claims. (Cl. 106—290)

This invention relates to improvements in metallic paste pigments of the kind known to the art as aluminum paste pigment. Such a paste pigment is adapted to be added to a varnish or other vehicle to form paint, inks and similar products. As manufactured, the aluminum paste consists essentially of flakes of aluminum metal, i. e. of aluminum or aluminum base alloy, pasted or mixed with a suitable liquid phase such as mineral spirits or other vehicle. The metal flakes usually represent at least 50 percent by weight of the paste and sometimes form as much as 90 percent by weight of the total paste. The paste likewise contains a leafing agent. Leafing agents are well known both in composition and function. In most commercial pastes the leafing agent is a fatty acid, stearic acid being presently widely used. Such leafing agents are considered as being associated with the surfaces of the metal flakes. In any event, the agent imparts to the flakes the property of "leafing," i. e. forming a layer of metallic pigment on the surface of the vehicle with which the paste is thoroughly mixed. Sometimes an excess of leafing agent, over that necessary to promote leafing, is furnished in the paste to impart a greater resistance to deterioration in storage. These aluminum paste pigments may be, and are, made in various ways, some processes of manufacture producing a better paste than others but all producing a product such as just described.

All such pastes, to greater or lesser extent, tend to deteriorate when stored for relatively long periods under normal conditions. If stored under conditions where the temperature is excessive or where moist air may come in contact therewith the deterioration is more rapid. The deterioration above referred to is physically measured in terms of loss of leafing power. Since the propensity of the flake to leaf in the paint vehicle is the basic determinate of the brilliance and covering power of paint compositions made from such pastes any deterioration varies the quality of the final paint product.

The problem of deterioration just outlined is the problem to the solution of which this invention is directed. It is the object of this invention to so modify the composition of the aluminum paste pigments above described as to inhibit or diminish deterioration of leafing power during storage. Another object is to provide aluminum pastes which are uniform in their resistance to deterioration, this object being desirable to the production of pastes having predictable reaction to standard storage conditions. A further object of the invention is the provision of methods of improving the resistance to deterioration of aluminum paste pigments.

The invention consists in improving the power of aluminum paste pigments to resist deterioration by the addition to the paste of an aliphatic alcohol represented by the formula $C_n H_{2n+1}$—OH where $n$ is not less than 12 nor greater than 20. When present in such a paste these alcohols suppress, diminish or entirely inhibit loss of leafing power under storage conditions without having substantial deleterious effect upon the other useful properties of the paste. Such aliphatic alcohols are not leafing agents and do not improve the initial leafing power of the paste. Their function appears to be protective rather than promotive. The amount of these alcohols which will produce optimum results will vary somewhat with the characteristics and origin of the paste. Usually the defined aliphatic alcohols are not effective, for practical purposes, in amounts much less than about 0.2 percent by weight of the metal flake content of the paste. On the other hand, amounts over about 5 percent of such alcohols are usually excessive in the sense that no better results may be obtained and the paste becomes "loaded" with an unnecessary amount of alcohol. One possible effect of this overloading may be undesirable plasticizing of the paint film. The alcohols are sufficiently soluble within these amounts, in the substances which usually form, or are a major component of, the liquid phase of the paste. Where solubility is limited there is nothing to be gained by addition of these alcohols in amounts greatly exceeding their solubility in said liquid phase. Substances usually forming all or a major component of the liquid phase of the paste, such as mineral spirits, turpene or aromatic hydrocarbons, esters and the like, dissolve the defined alcohols in substantial amounts. Of the various defined alcohols, cetyl and octadecyl appear to have the greatest efficiency in suppressing loss of leafing power during storage of the paste.

In the practice of this invention the alcohol or alcohols of formula $C_n H_{2n+1}$—OH, where $n$ is not less than 12 nor greater than 20, selected as paste additives may be incorporated in the paste at any convenient stage in the manufacture thereof or after manufacture is otherwise complete, the particular method of incorporation being no part of this invention. The improved aluminum paste pigments which are the subject of this invention, when mixed wtih a vehicle form paints which are considerably superior in their ability to retain leafing power on standing.

The following test results are exemplary of the advantages secured by the practice of this invention. These tests were made on a standard aluminum paste composed of aluminum flake, a mineral spirits vehicle and stearic acid as a leafing agent, the latter in amount of about 2 percent by weight of the metal content of the paste. Total metal in the paste was about 65 percent by weight. Separate samples were taken from one batch of this paste. One sample was tested as taken. To another sample was added 1 percent by weight (of the total metal content of the paste) of dodecyl alcohol ($C_{12}H_{25}OH$). To a third sample 1 percent of cetyl alcohol ($C_{16}H_{33}OH$) was added, while to a fourth sample was added the same amount of octadecyl alcohol ($C_{18}H_{37}OH$). Each of the samples, which weighed 100 grams, was placed in a metal container to which moisture had been added, the preparation of the sample being exactly that described in Standard D-480-44, paragraph 8, published in "A. S. T. M." Standards for 1944, part II, by the American Society for Testing Materials. The samples were stored for 10 weeks at a temperature of 45 degrees centigrade and then tested for leafing capacity in accordance with the aforesaid Standard D-480-44, paragraph 4. The results obtained were as follows:

| Paste Sample containing— | Loss in Leafing Capacity |
|---|---|
| | Per cent |
| No alcohol | 27 |
| 1% dodecyl alcohol | 16 |
| 1% cetyl alcohol | 9 |
| 1% octadecyl alcohol | 9 |

Alcohols other than those defined herein either had no beneficial effect or adversely affected the leafing capacity when tested under the same circumstances and in the same paste. For instance, a sample of the same paste to which 1% of decyl alcohol had been added showed 34% loss of leafing capacity while another sample containing 1% of ceryl alcohol showed a complete loss of leafing capacity.

The effect of increasing amounts of an alcohol herein defined upon the leafing capacity of the paste may be illustrated by reference to another series of tests performed with a similar paste, the samples being prepared and tested in the manner above described. These samples were stored for 4 weeks at 45 degrees centigrade. The samples contained varying amounts of cetyl alcohol as shown in the following tabulation:

| Amount of cetyl alcohol incorporated in the paste; per cent of the weight of metal content of the paste | Loss in Leafing Capacity |
|---|---|
| | Per cent |
| None | 12 |
| 0.25 | 4 |
| 0.50 | 3 |
| 1.00 | 4 |
| 1.50 | None |
| 2.00 | None |
| 5.00 | None |

Having thus described my invention, I claim:

1. An aluminum paste pigment having improved resistance to deterioration of leafing power and comprising aluminum flakes, a liquid hydrocarbon phase and a leafing agent and containing at least about 0.2 to about 5 per cent, of the weight of said metal flakes, of an aliphatic alcohol represented by the formula $C_nH_{2n+1}-OH$ where $n$ is not less than 12 nor greater than 20, said liquid hydrocarbon phase being a solvent for said alcohol.

2. An aluminum paste pigment having improved resistance to deterioration of leafing power and comprising aluminum flakes, a liquid hydrocarbon phase and a leafing agent and containing at least about 0.2 to about 5 per cent, of the weight of said metal flakes, of an aliphatic alcohol represented by the formula $C_nH_{2n+1}-OH$ where $n$ is not less than 12 nor greater than 20, said liquid hydrocarbon phase containing a solvent for said alcohol, said paste being more uniform in resistance to deterioration than the same paste not containing said alcohol.

3. An aluminum paste pigment having improved resistance to deterioration of leafing power and comprising aluminum flakes, a liquid hydrocarbon phase and a leafing agent and containing at least about 0.2 per cent, of the weight of said metal flakes, of an aliphatic alcohol represented by the formula $C_nH_{2n+1}-OH$ where $n$ is not less than 12 nor greater than 20, said liquid hydrocarbon phase being a solvent for said alcohol.

EVERETT R. ALLEN.

REFERENCES CITED

The following references are of record in the file of this patent:

UNITED STATES PATENTS

| Number | Name | Date |
|---|---|---|
| 2,250,956 | Harris | July 29, 1941 |